(12) United States Patent
Blais et al.

(10) Patent No.: US 11,460,834 B2
(45) Date of Patent: Oct. 4, 2022

(54) VALIDATING AN UPGRADE FOR A DATA ACQUISITION SYSTEM

(71) Applicant: PRATT & WHITNEY CANADA CORP., Longueuil (CA)

(72) Inventors: Mario Blais, Varennes (CA); Clement Drouin Laberge, Terrebonne (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 358 days.

(21) Appl. No.: 16/801,302

(22) Filed: Feb. 26, 2020

(65) Prior Publication Data
US 2021/0263512 A1   Aug. 26, 2021

(51) Int. Cl.
| G06F 8/65 | (2018.01) |
| G05B 23/02 | (2006.01) |
| G01D 1/00 | (2006.01) |
| G01D 1/02 | (2006.01) |

(52) U.S. Cl.
CPC ........... *G05B 23/0235* (2013.01); *G01D 1/00* (2013.01); *G01D 1/02* (2013.01); *G05B 23/0221* (2013.01); *G06F 8/65* (2013.01)

(58) Field of Classification Search
CPC .............................. H04W 84/12; H04W 72/12
USPC ......................................................... 370/329
See application file for complete search history.

(56) References Cited

U.S. PATENT DOCUMENTS 8,049,132 B2   11/2011   Bouet et al.

FOREIGN PATENT DOCUMENTS

| EP | 3421164 A1 | 1/2019 |
| EP | 3492703 A1 | 6/2019 |

*Primary Examiner* — Angel T Brockman
(74) *Attorney, Agent, or Firm* — Norton Rose Fulbright Canada LLP

(57) ABSTRACT

There are described a method, apparatus, and kit for validating an upgrade to a data acquisition system (DAS). The method comprises acquiring measurement data from a composite part using an upgraded DAS, the composite part representing a family of parts and having features from different parts of the family of parts incorporated thereon; comparing the measurement data to reference data defining tolerances for the measurement data; and validating the upgrade to the DAS based on the comparing of the measurement data to the reference data.

20 Claims, 6 Drawing Sheets

VALIDATING AN UPGRADE FOR A DATA ACQUISITION SYSTEM

TECHNICAL FIELD

The present disclosure relates generally to data acquisition systems, and more particularly to the validation of upgrades to such systems prior to deployment of the upgrades.

BACKGROUND OF THE ART

The manufacturing of parts is a complex process that involves many steps. Changes to the process can have a negative impact, such as collisions between parts and equipment, parts falling out of tolerance, etc.

Therefore, improvements are needed.

SUMMARY

In accordance with a broad aspect, there is provided a method for validating an upgrade to a data acquisition system (DAS). The method comprises acquiring measurement data from a composite part using an upgraded DAS, the composite part representing a family of parts and having features from different parts of the family of parts incorporated thereon; comparing the measurement data to reference data defining tolerances for the measurement data; and validating the upgrade to the DAS based on the comparing of the measurement data to the reference data.

In accordance with another broad aspect, there is provided an apparatus for validating an upgrade to a data acquisition system (DAS). The apparatus comprises a processing unit and a non-transitory computer readable medium having stored thereon program code. The program code is executable by the processing unit for acquiring measurement data from a composite part using an upgraded DAS, the composite part representing a family of parts and having features from different parts of the family of parts incorporated thereon; comparing the measurement data to reference data defining tolerances for the measurement data; and validating the upgrade to the DAS based on the comparing of the measurement data to the reference data.

In accordance with yet another broad aspect, there is provided a kit for validating an upgrade to a data acquisition system (DAS). The kit comprises a composite part representing a family of parts and having features from different parts of the family of parts incorporated thereon; and a non-transitory computer-readable medium having stored thereon program code. The program code is executable by a processing unit for acquiring measurement data from the composite part using an upgraded DAS; comparing the measurement data to reference data defining tolerances for the measurement data; and validating the upgrade to the DAS based on the comparing of the measurement data to the reference data.

Features of the apparatus, method, and kit described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for validating an upgrade to a data acquisition system (DAS). The upgrade may be a software upgrade, a hardware upgrade, or a process upgrade. A software upgrade relates to software used to control the DAS to inspect a part produced using a production tool. A hardware upgrade relates to any physical part of the DAS, including computer hardware and non-computer hardware. A process upgrade relates to the manner in which the part is inspected, such as but not limited to the order of steps, the duration of steps, the inclusion or removal of steps, and the like. For example, a process upgrade may change the point cloud density for data acquisition, change the acquisition time of measurement data, etc.

The part may be produced using a wide variety of techniques, such as but not limited to machining, injection molding, three-dimensional printing, and the like. In some embodiments, the part is a component from a gas turbine engine, such as those used in aircraft. Example gas turbine engines include turboprop engines, turboshaft engines, turbofan engines, and the like. The part may also be used in other industries and/or for other applications.

Figure 1:
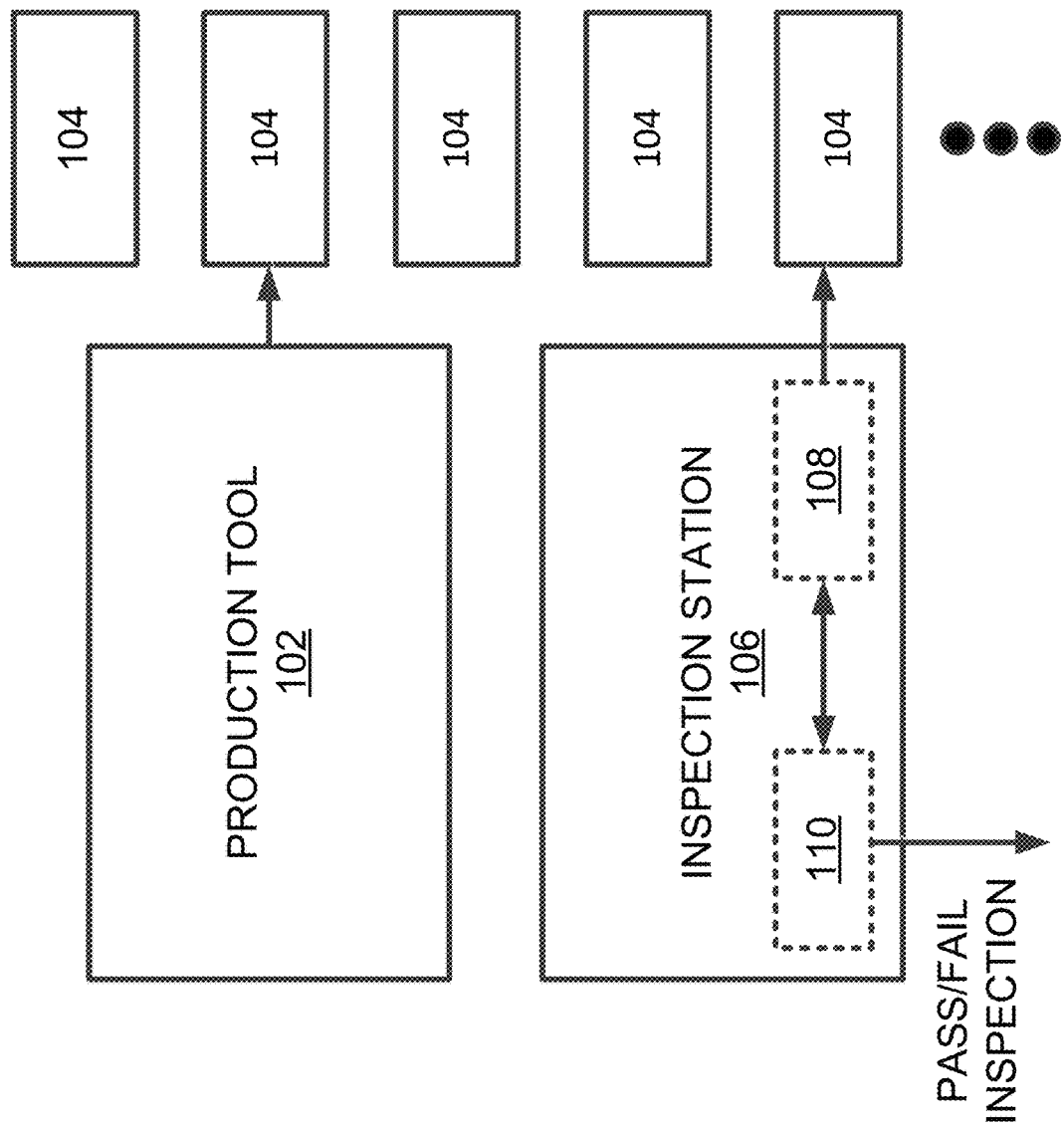
FIG. 1 is a block diagram of an example production tool and inspection station for producing parts.

With reference to FIG. 1, there is illustrated an example production tool 102 for producing parts 104. Once produced, the parts 104 are provided to an inspection station 106, where inspection is performed. Inspection determines whether the parts 104 as produced are within one or more predetermined tolerance. The parts 104 may be conveyed to the inspection station 106 on a conveyor. The parts 104 may also be carried to the inspection station 106, or transferred thereto using any automated or motorized instrument or equipment.

Figure 2:
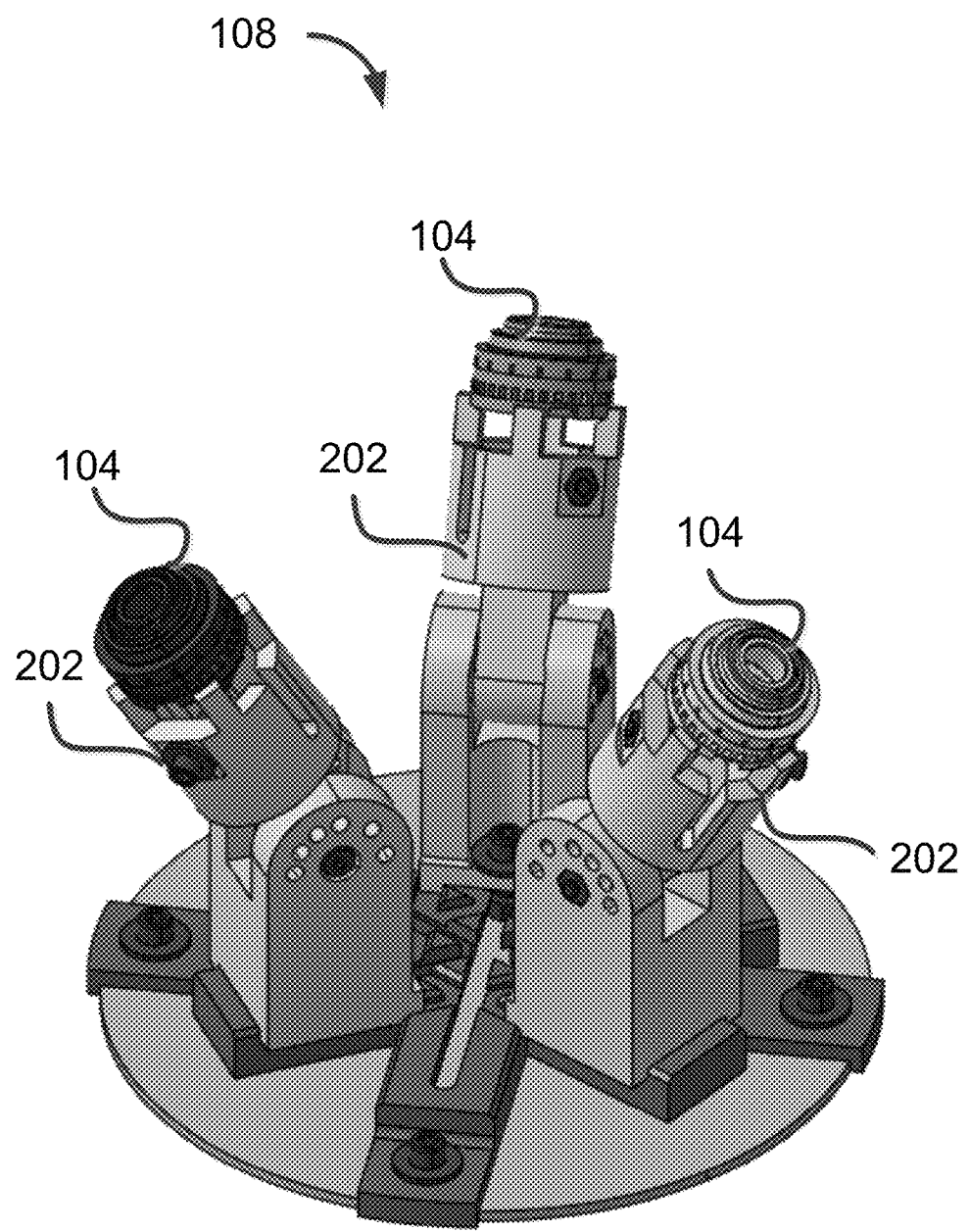
FIG. 2 is a schematic diagram of a portion of a data acquisition system.

Once the parts 104 reach the inspection station 106, measurement data is acquired from the parts 104 using one or more DAS 108. Various types of DAS 108 may be used, such as a coordinate-measuring machine (CMM), a line scanner, a computed tomography scanner, a white light 3D scanner, etc. In some embodiments, the DAS 108 is an imaging system comprising a camera, an imaging lens, and an illumination source. An example embodiment of a portion of a DAS 108 is shown in FIG. 2. A plurality of fixtures 202 can receive parts 104 for acquisition of the measurement data. More or less fixtures 202 may be provided for a given DAS 108. In some embodiments, the fixtures are omitted and the measurement data is acquired with the parts 104 in a resting state on a surface. The measurement data may correspond to one or more images of the part 104. The measurement data may also correspond to a point cloud of one or more surfaces of the part 104. The point cloud may be directly rendered or converted to a polygon mesh, a triangle mesh model, a NURBS surface model, a CAD model, or the like, through surface reconstruction. The measurement data may be 2D or 3D.

Referring back to FIG. 1, a controller 110 receives the measurement data from the DAS 108 and compares the measurement data to inspection data defining one or more tolerance with respect to nominal parameters for the parts 104. Although illustrated as separate from the DAS 108, the controller 110 may also be integrated with or form part of the DAS 108. The nominal parameters may refer to any manufacturing parameters, such as but not limited to outside dimensions, thickness, external corner radii, length, straightness, twist, mass, and the like. The inspection data may include tolerances for any geometric parameters associated with the parts 104. Inspection of the part passes or fails based on the comparison of the measurement data with the inspection data.

Figure 3:
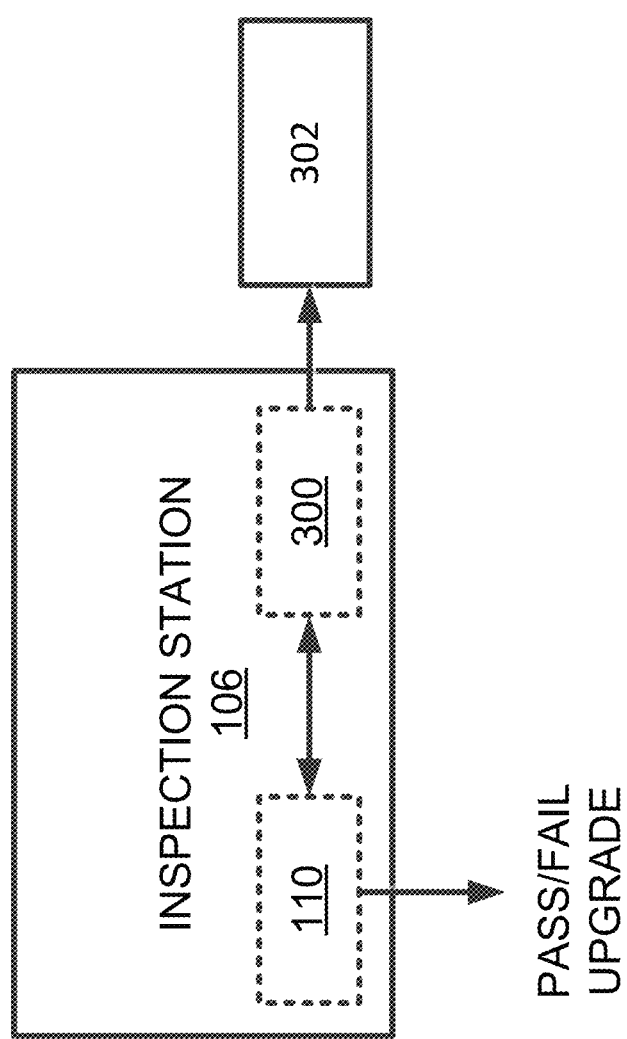
FIG. 3 is a block diagram of an example setup for validating an upgrade to a data acquisition system.

Upgrades to the DAS 108 are validated prior to being deployed. Referring to FIG. 3, there is illustrated an upgraded DAS 300. The upgrade may relate to one or more of software, hardware, and process. Validation of the upgrade is performed using a composite part 302. The composite part 302 represents a family of parts and has various features from different parts of the family of parts incorporated thereon. In some embodiments, the composite part 302 has a feature from each part of the family of parts. In some embodiments, the composite part 302 has certain features, considered to be "complex" features, that are critical to validating the update. For example, complex features may have certain angles or shapes that are non-traditional. Complex features may have tighter tolerances than non-complex features. In some embodiments, the composite part 302 is composed of a variety of complex and non-complex features and allows the update to be validated for all of the parts forming the family of parts.

Figure 4:
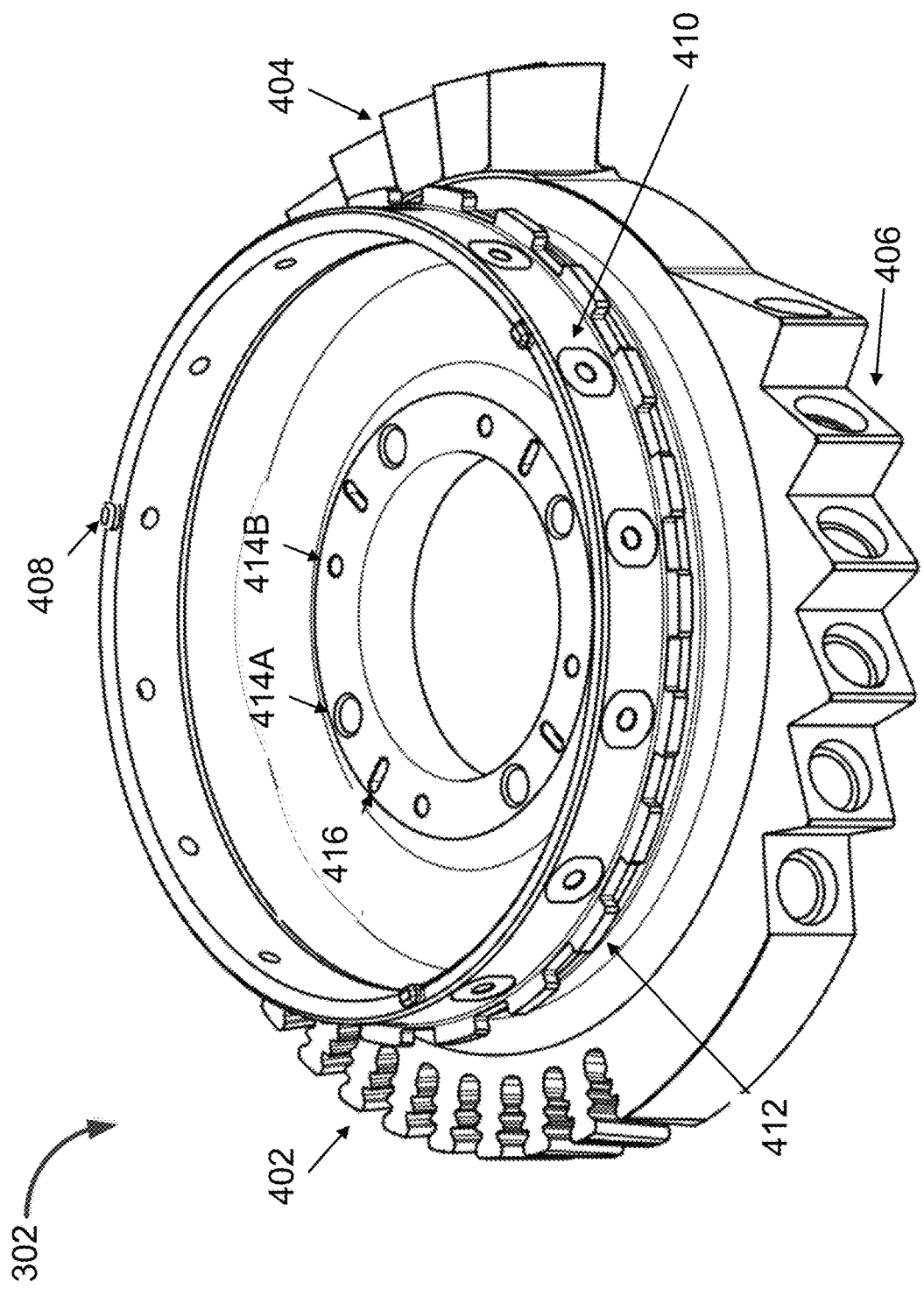
FIG. 4 is an example embodiment of a composite part.

An example of a composite part 302 is shown in FIG. 4. In this example, various features of different parts of a gas turbine engine are provided. The composite part 302 has firtree slots 402, which are typically found on a disc of a bladed rotor assembly. The composite part 302 also has airfoils 404, which may be found on a rotor blade, and diffuser holes, which may be found on a liner or a heat shield of a combustion chamber. These features 402, 404, 406 are together found on the composite part 300 for validating the DAS upgrade. Additional features such as trimming lugs 408, angular hole patterns 410, lug patterns 412, hole patterns 414A, 414B, and slot patterns 416 are also provided on the composite part and may be found on multiple different parts.

In the example shown in FIG. 4, the firtree slots 402, airfoils 404 and diffuser holes 406 may be considered as complex features due to the complexity associated with the shape of each feature. The features related to lugs, holes and slots may be considered to be non-complex features. A same feature may be provided with different geometric parameters, such as the hole patterns 414A, 414B that are of different sizes. The examples shown in the composite part 302 are for illustration purposes only. More or less features may be provided, and may differ from the ones illustrated. In some embodiments, in addition to the features, one or more known defect may be added to the composite part 302.

Referring back to FIG. 3, measurement data is acquired from the composite part 302 by the upgraded DAS 300. The controller 110 compares the measurement data to reference data defining tolerances for the measurement data. The reference data may comprise geometrical data relating to the geometrical parameters of the part. The reference data may also comprise other parameters related to the inspection and/or to the data acquisition, such as acquisition time, point cloud density, quality of imaging, noise, etc.

In some embodiments, the reference data is obtained by scanning the composite part 302 on at least one non-upgraded DAS, such as DAS 108. The reference data may correspond to an average of measurement data acquired from the non-upgraded DAS over a plurality of acquisition cycles, or may correspond to an average of measurement data acquired from a plurality of non-upgraded DAS. An error margin may be added to the measurement data as acquired from a non-upgraded DAS to form the reference data. In some embodiments, the reference data is obtained through one or more simulation of the acquisition of measurement data from a non-upgraded DAS. In some embodiments, the reference data is virtually created. Data unrelated to geometrical parameters may be added to the reference data in accordance with various requirements and/or criteria associated with the inspection of a part.

Validation of the upgrade to the DAS is performed based on the comparison of the measurement data to the reference data. Validation refers to accepting or rejecting the upgrade, for example by issuing a signal indicative of a pass or fail. For a pass, validation may comprise certifying the upgrade. In some embodiments, validation may comprise authorizing deployment of the upgrade on other DAS. For a fail, validation may comprise identifying a source of the failure, or an issue that caused the validation of the upgrade to fail. For example, potential sources of variation between the measurement data and the reference data may be determined based on which one(s) of the parameters from the reference data failed to be met, such as the geometrical parameters, acquisition time, point cloud density, quality of imaging, noise, etc.

In some embodiments, the upgrade is accepted if the measurement data is within the tolerances of the reference data. Alternatively or in combination therewith, in some embodiments the upgrade is accepted if the one or more known defect provided on the composite part 302 is detected.

Figure 5:
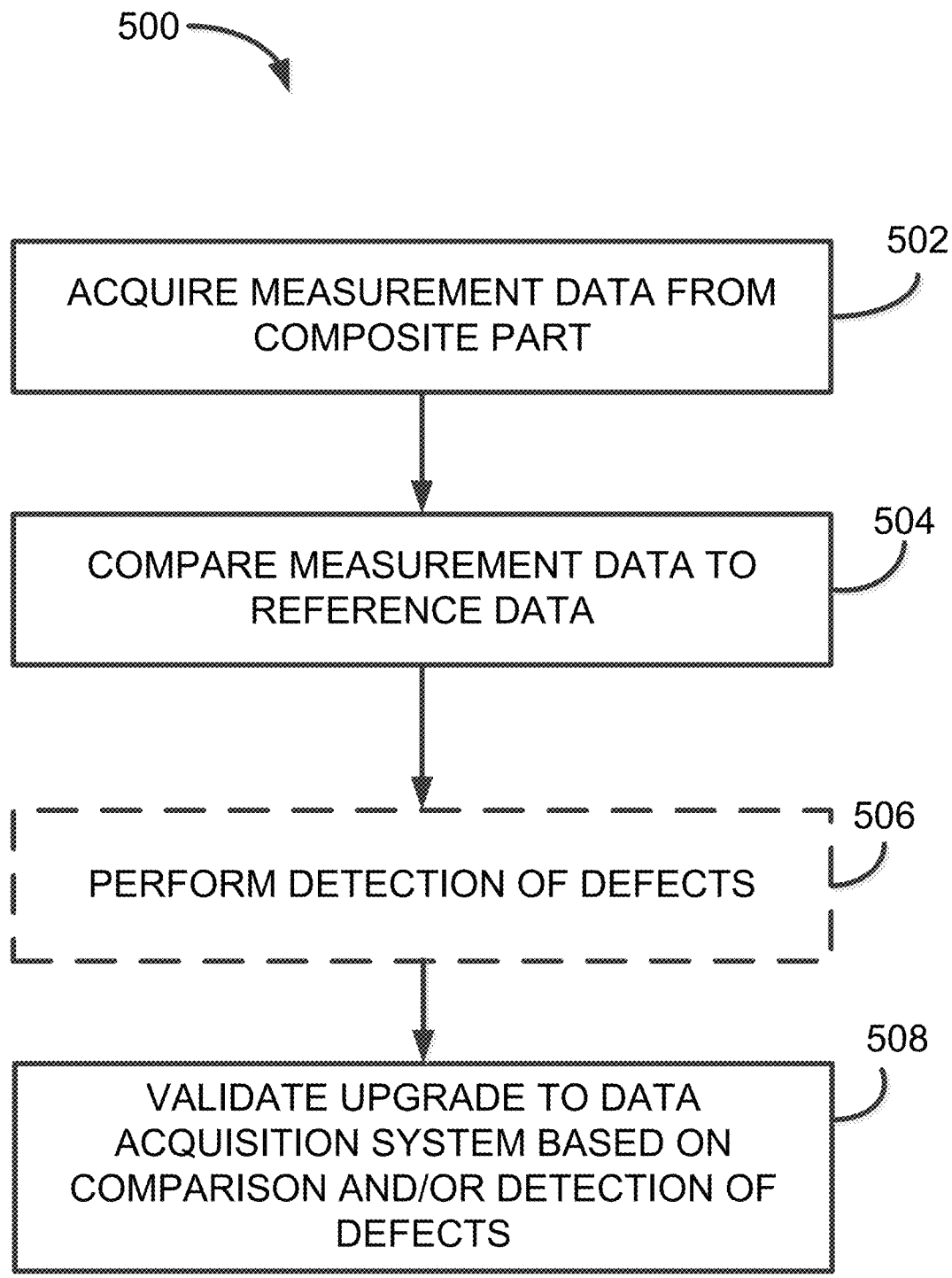
FIG. 5 is a flowchart of an example method for validating an upgrade to a data acquisition system.

With reference to FIG. 5, there is illustrated a method 500 of validating an upgrade on a DAS. At step 502, measurement data is acquired from a composite part. As stated above, the composite part is composed of features that come from multiple parts in a family of parts. Some features may be found on several of the parts while others may be found on only one of the parts. Some features are complex while others are non-complex (i.e. holes, slots, etc). The composite part may also, in some embodiments, comprise one or more known defects associated with one or more of the features. The measurement data is acquired using an upgraded DAS.

At step 504, the measurement data is compared to the reference data. The reference data may comprise geometrical parameters as well as other types of parameters, such as parameters related to acquisition time, data quality, data density, etc. The geometrical parameters may be obtained by acquiring measurement data from the composite part using one or more non-upgraded DAS.

Optionally at step 506, the detection of defects is performed in an attempt to detect the known defect. Step 506 may also be omitted.

At step 508, the upgrade is validated based on the comparison and/or the detection of the known defects. The upgrade is thus accepted or rejected as a function of whether the measurement data is within the tolerances defined by the reference data and/or the ability to detect the known defect(s) on the composite part.

Figure 6:
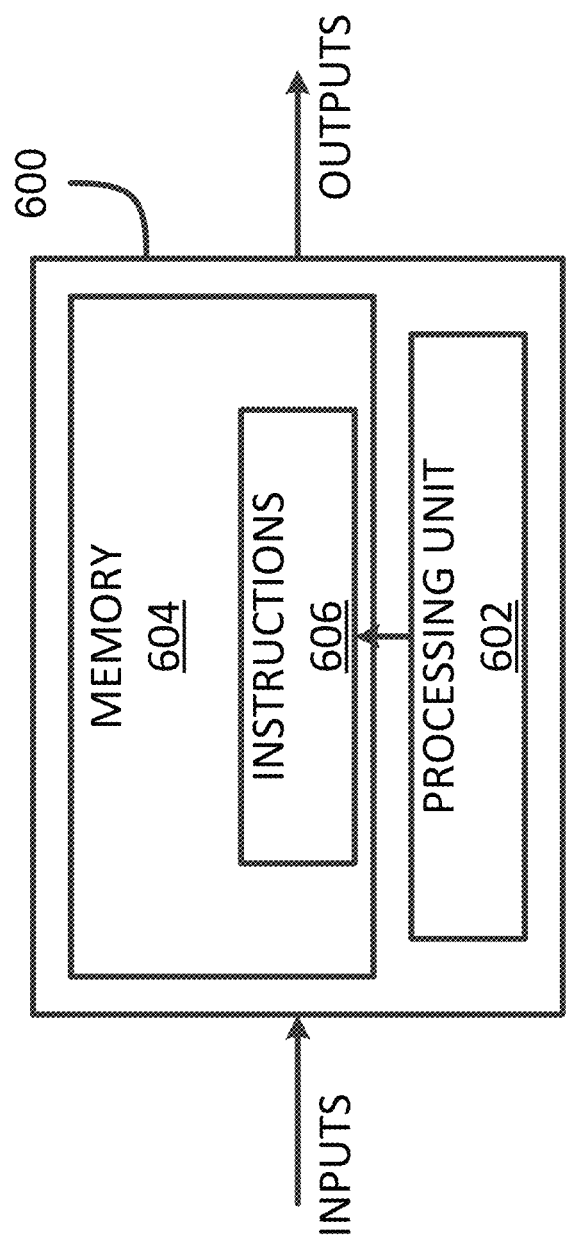
FIG. 6 is a block diagram of an example computing device for implementing the method of FIG. 5.

With reference to FIG. 6, an example of a computing device 600 is illustrated. The method 500 may be implemented with one or more of the computing devices 600. The computing device 600 comprises a processing unit 602 and a memory 604 which has stored therein computer-executable instructions 606. The processing unit 602 may comprise any suitable devices configured to implement the method 500 or any variants thereof, such that instructions 606, when executed by the computing device 600 or other programmable apparatus, may cause the functions/acts/steps performed as part of the method 500 to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 602 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 606 executable by processing unit 602.

The methods and systems for validating a DAS upgrade described herein may be implemented in a high level procedural or object oriented programming or scripting language, or a combination thereof, to communicate with or assist in the operation of a computer system, for example the computing device 600. Alternatively, the methods and systems for validating a DAS upgrade may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 602 of the computing device 500, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, upgrades made and validated on a DAS may be recorded for traceability. A history of upgrades of a given DAS may be taken into account in order to assess the validity of future upgrades. In another example, the upgrade may be tested on more than one family of parts before being validated, where each test is performed on a different composite part. Yet further modifications could be implemented by a person of ordinary skill in the art in view of the present disclosure, which modifications would be within the scope of the present technology.

The invention claimed is:

1. A method for validating an upgrade to a data acquisition system (DAS), the method comprising:
   acquiring measurement data from a composite part using an upgraded DAS, the composite part representing a family of parts and having features from different parts of the family of parts incorporated thereon;
   comparing the measurement data to reference data defining tolerances for the measurement data; and
   validating the upgrade to the DAS based on the comparing of the measurement data to the reference data.

2. The method of claim 1, wherein the reference data is obtained from the composite part on at least one non-upgraded DAS.

3. The method of claim 2, wherein the reference data is an average of data acquired from a plurality of the at least one non-upgraded DAS.

4. The method of claim 2, wherein the reference data is an average of data acquired from the at least one non-upgraded DAS over a plurality of data acquisition cycles.

5. The method of claim 1, wherein the upgrade is a software upgrade to the DAS.

6. The method of claim 1, wherein the upgrade is a hardware upgrade to the DAS.

7. The method of claim 1, wherein validating the upgrade comprises issuing a pass signal when the measurement data is within the tolerances.

8. The method of claim 1, wherein the composite part has a known defect, and wherein validating the upgrade comprises issuing a pass signal when the known defect is detected.

9. The method of claim 1, wherein at least one of the features corresponds to a complex feature of the family of parts.

10. An apparatus for validating an upgrade to a data acquisition system (DAS), the system comprising:
    a processing unit; and
    a non-transitory computer readable medium having stored thereon program code executable by the processing unit for:
       acquiring measurement data from a composite part using an upgraded DAS, the composite part representing a family of parts and having features from different parts of the family of parts incorporated thereon;

comparing the measurement data to reference data defining tolerances for the measurement data; and validating the upgrade to the DAS based on the comparing of the measurement data to the reference data.

11. The apparatus of claim 10, wherein the reference data is obtained from the composite part on at least one non-upgraded DAS.

12. The apparatus of claim 11, wherein the reference data is an average of data acquired from a plurality of the at least one non-upgraded DAS.

13. The apparatus of claim 11, wherein the reference data is an average of data acquired from the at least one non-upgraded DAS over a plurality of data acquisition cycles.

14. The apparatus of claim 10, wherein the upgrade is a software upgrade to the DAS.

15. The apparatus of claim 10, wherein the upgrade is a hardware upgrade to the DAS.

16. The apparatus of claim 10, wherein validating the upgrade comprises issuing a pass signal when the measurement data is within the tolerances.

17. The apparatus of claim 10, wherein the composite part has a known defect, and wherein validating the upgrade comprises issuing a pass signal when the known defect is detected.

18. The apparatus of claim 10, wherein at least one of the features corresponds to a complex feature of the family of parts.

19. A kit for validating an upgrade to a data acquisition system, the kit comprising:

a composite part representing a family of parts and having features from different parts of the family of parts incorporated thereon; and a non-transitory computer-readable medium having stored thereon program code executable by a processing unit for:

acquiring measurement data from the composite part using an upgraded DAS;

comparing the measurement data to reference data defining tolerances for the measurement data; and validating the upgrade to the DAS based on the comparing of the measurement data to the reference data.

20. The kit of claim 19, wherein at least one of the features corresponds to a complex feature of the family of parts.

* * * * *